(12) United States Patent
Adkins et al.

(10) Patent No.: US 7,921,081 B2
(45) Date of Patent: Apr. 5, 2011

(54) MANAGING A SNAPSHOT STORED WITHIN A FILE SYSTEM SPACE FOR EFFICIENT DETECTION OF IN-USE BLOCKS

(75) Inventors: Janet E. Adkins, Austin, TX (US); Joon Chang, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 970 days.

(21) Appl. No.: 11/755,315

(22) Filed: May 30, 2007

(65) Prior Publication Data

US 2008/0301203 A1  Dec. 4, 2008

(51) Int. Cl.
 G06F 7/00 (2006.01)
 G06F 17/00 (2006.01)
 G06F 12/00 (2006.01)
 G06F 13/00 (2006.01)
 G06F 15/16 (2006.01)

(52) U.S. Cl. ......... 707/649; 707/696; 707/823; 711/162
(58) Field of Classification Search .................. 707/649, 707/696, 823; 711/162
See application file for complete search history.

(56) References Cited

U.S. PATENT DOCUMENTS

| | | | |
|---|---|---|---|
| 6,959,313 B2 * | 10/2005 | Kapoor et al. | 707/649 |
| 7,043,485 B2 * | 5/2006 | Manley et al. | 707/658 |
| 7,409,414 B2 * | 8/2008 | Okada et al. | 707/648 |
| 7,676,514 B2 * | 3/2010 | Faibish et al. | 707/646 |
| 7,702,670 B1 * | 4/2010 | Duprey et al. | 707/646 |
| 2003/0182322 A1 * | 9/2003 | Manley et al. | 707/201 |
| 2005/0021565 A1 * | 1/2005 | Kapoor et al. | 707/200 |
| 2005/0182797 A1 | 8/2005 | Adkins et al. | |

OTHER PUBLICATIONS

"Overview of ZFS Snapshots", Sun Microsystems4 pages, [online], [print accessed on Apr. 25, 2007]. Retrieved from <http://docs.sun.com/app/docs/doc/817-2271/6mhupg6ga?a=view#gbcxc>.

"Fast Initialization of File System Snapshot", International Business Machines Corporation, Nov. 20, 2003, 3 pages, [online], ip.com prior art database, IPCOM000020430D.

* cited by examiner

*Primary Examiner* — Greta L Robinson
*Assistant Examiner* — Brian E Weinrich
(74) *Attorney, Agent, or Firm* — Matthew W. Baca; Amy J. Pattillo

(57) ABSTRACT

In one embodiment, at least one snapshot thread manages a point in time snapshot of a file system stored within the space allocated to the file system. The snapshot thread tracks, for at least one block of the plurality of blocks of the file system, a separate entry in a snapshot map specifying if each at least one block is newly allocated following the creation of the point in time snapshot and specifying an addressed location of a snapshot copy of the at least one block if copied. Separately, a file system handling thread tracks a mapping of an allocation state of each of said plurality of blocks of the file system. Responsive to detecting the file system triggered to write or delete a particular block from among the at least one block of the file system, the snapshot thread allows the file system to write to or delete the particular block without making a snapshot copy of the particular block if a particular entry for the particular block in the snapshot map specifies the particular block is newly allocated, wherein a block marked newly allocated was not in-use at the point in time of the file system snapshot.

7 Claims, 4 Drawing Sheets

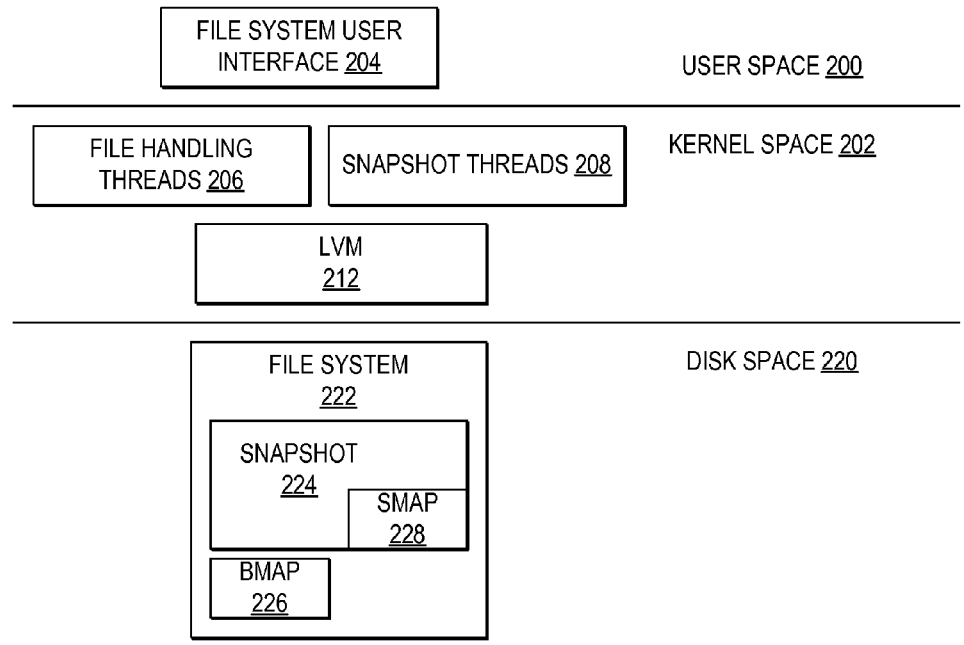
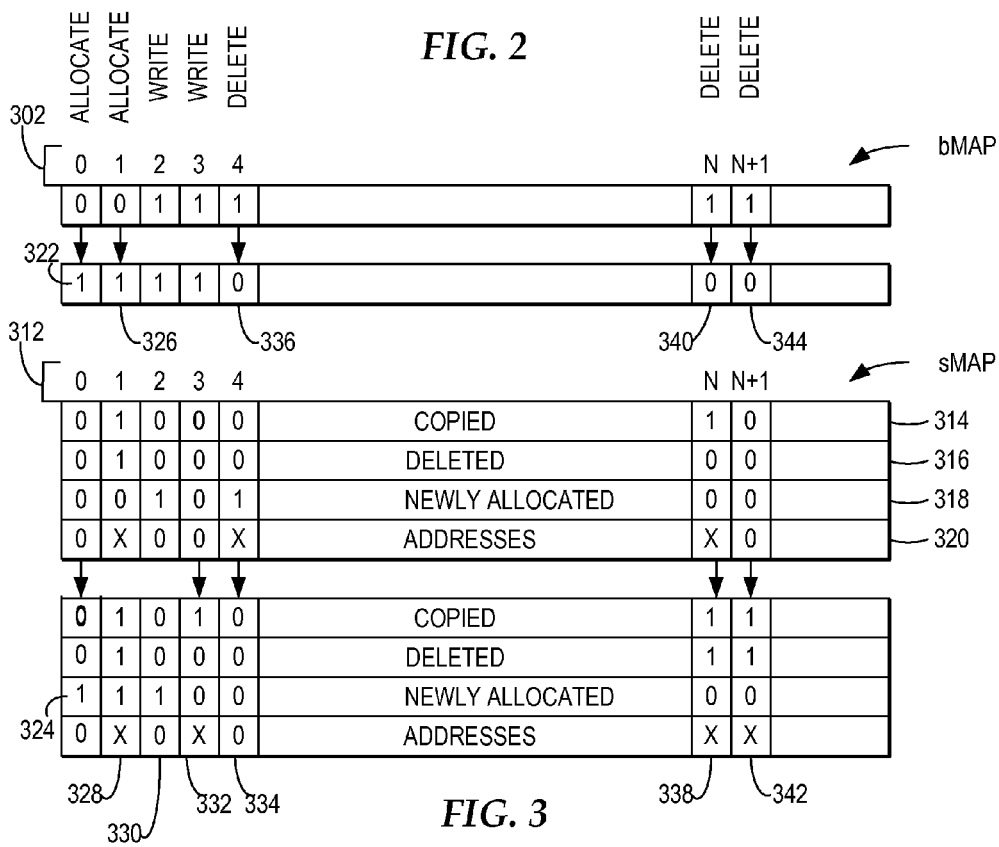

US 7,921,081 B2

MANAGING A SNAPSHOT STORED WITHIN A FILE SYSTEM SPACE FOR EFFICIENT DETECTION OF IN-USE BLOCKS

BACKGROUND OF THE INVENTION

1. Technical Field

The present invention relates in general to improved file system management. Still more particularly, the present invention relates to managing a snapshot within a file system space for efficient detection of in-use blocks.

2. Description of the Related Art

A file system is a mechanism for storing and retrieving files on a disk. A file system defines the directory for keeping track of the files and the path syntax required to access the files. The file system also defines the way files are named and limits the maximum file size of the file or volume. A file system generally consists of two distinct parts: a collection of files and a directory structure. Each file in the collection of files stores related data. The directory structure organizes and provides information about the files in the file system.

An important attribute of a system that supports a file system, is the backup support for the file system. In one example, a snapshot function of an operating system maintains a read-only copy that reflects the state of the file system at the time of creation of the file system snapshot. A backup of the snapshot can be created for recovery purposes.

In particular, a file system snapshot establishes a consistent block level image of the blocks of the file system at a point in time. A block is a group of data that is transmitted or processed together at the same time. A block is also referred to as a data block.

A file system snapshot copies the modified blocks which were in use in the file system at the point in time when a snapshot was created in order to maintain the point in time image. In one example, a file system maintains a bitmap file, also referred to as a bMap, to track the allocation state of the blocks in the file system. In addition, the bMap can be checked by the snapshot controller to determine whether a block was in use at the time a snapshot was created.

If the snapshot is written to a device separate from the file system, then the blocks allocated for the snapshot are not tracked by the bMap of the file system. In this example where the snapshot is written to a device separate from the file system, the snapshot controller can easily preserve a copy of the file system at a point in time based on the bMap because an update to the snapshot does not update the bMap.

In contrast, when a snapshot is written within the file system space itself, the blocks allocated to the snapshot are also tracked in the bMap of the file system. Tracking blocks allocated to the snapshot in the bMap within the file system creates the potential for recursion when attempting to maintain the snapshot. For example, a block being allocated is tracked by a bMap page. When the allocation of the block is the first modification of the bMap page since the snapshot was created, the point in time image of the bMap page must be copied in order to preserve the point in time image of the bMap page. To copy the point in time image of the bMap page into the snapshot, the file system must allocate additional blocks to the snapshot, resulting in further modification of the bMap pages in the file system, and triggering recursive iterations of block allocations and updates to the bMap page.

In view of the foregoing, there is a need for a method, system, and program, when a snapshot is written to the file system space, to determine the in use state of blocks of the file system for managing a point in time snapshot, separate from the bMap which tracks allocations of blocks within the file system.

SUMMARY OF THE INVENTION

Therefore, the present invention provides, in general, improved file system backup management and in particular, provides for managing a snapshot stored within a file system space for efficient detection of in-use blocks.

In one embodiment, at least one snapshot thread manages a point in time snapshot of a file system stored within the space allocated to the file system. The snapshot thread tracks, for at least one block of the plurality of blocks of the file system, a separate entry in a snapshot map specifying if each at least one block is newly allocated following the creation of the point in time snapshot and specifying an addressed location of a snapshot copy of the at least one block if copied. Separately, a file system handling thread tracks a mapping of an allocation state of each of said plurality of blocks of the file system. Responsive to detecting the file system triggered to write or delete a particular block from among the at least one block of the file system, the snapshot thread allows the file system to write to or delete the particular block without making a snapshot copy of the particular block if a particular entry for the particular block in the snapshot map specifies the particular block is newly allocated, wherein a block marked newly allocated was not in-use at the point in time of the file system snapshot. In addition, each separate entry in the snapshot map may specify whether the block is copied and deleted.

If a particular block is being written to, the snapshot thread looks up the particular entry for the block in the snapshot map. If the snapshot thread detects the particular entry for the particular block is not marked at least one of newly allocated, copied, or deleted, the snapshot thread copies the particular block to a new addressed location, updates the particular entry for the particular block with the new addressed location, and marks the particular entry as copied prior to allowing the file system to write the particular block. If the particular entry for the particular block is marked at least one of newly allocated, copied and deleted, the snapshot thread allows the file system to write the particular block.

If a particular block is being deleted, the snapshot thread looks up the particular entry for the block in the snapshot map. If the snapshot thread detects the particular entry for the particular block in the snapshot map is empty, the snapshot thread copies the particular block to a new addressed location, updates the particular entry for the particular block with the new addressed location, and marks the particular entry as deleted and copied prior to allowing the file system to delete the particular block. If the snapshot thread detects the particular entry for the particular block in the snapshot map is marked newly allocated, the snapshot thread clears the newly allocated marking from the particular entry prior to allowing the file system to delete the particular block. If the snapshot thread detects the particular entry for the particular block in the snapshot map is marked copied, the snapshot thread marks the particular entry as copied and deleted in the particular entry prior to allowing the file system to delete the particular block.

Each block is assigned a block number indexed in both data structures for the bit mapping and the snapshot map. If the snapshot thread detects the particular block being allocated, written to, or deleted by the file system, the snapshot thread looks up the block number for the particular block in the snapshot map. If an entry exists at the block number for the particular block in the snapshot map, the snapshot thread returns the data in the particular entry for the block number. If the snapshot map does not already include an entry for the block number of the particular block, the snapshot thread allocates the page space for the particular entry in the snapshot map, initializes the page space to empty, and returns the separate entry marked as empty.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 2 is a block diagram illustrating layers of a file system with a file system snapshot stored within the disk space allocated to the file system;

FIG. 3 is a block diagram depicting one example of a bMap and an sMap implemented within a file system and management of block allocations;

DETAILED DESCRIPTION OF THE PREFERRED EMBODIMENT

Figure 1:
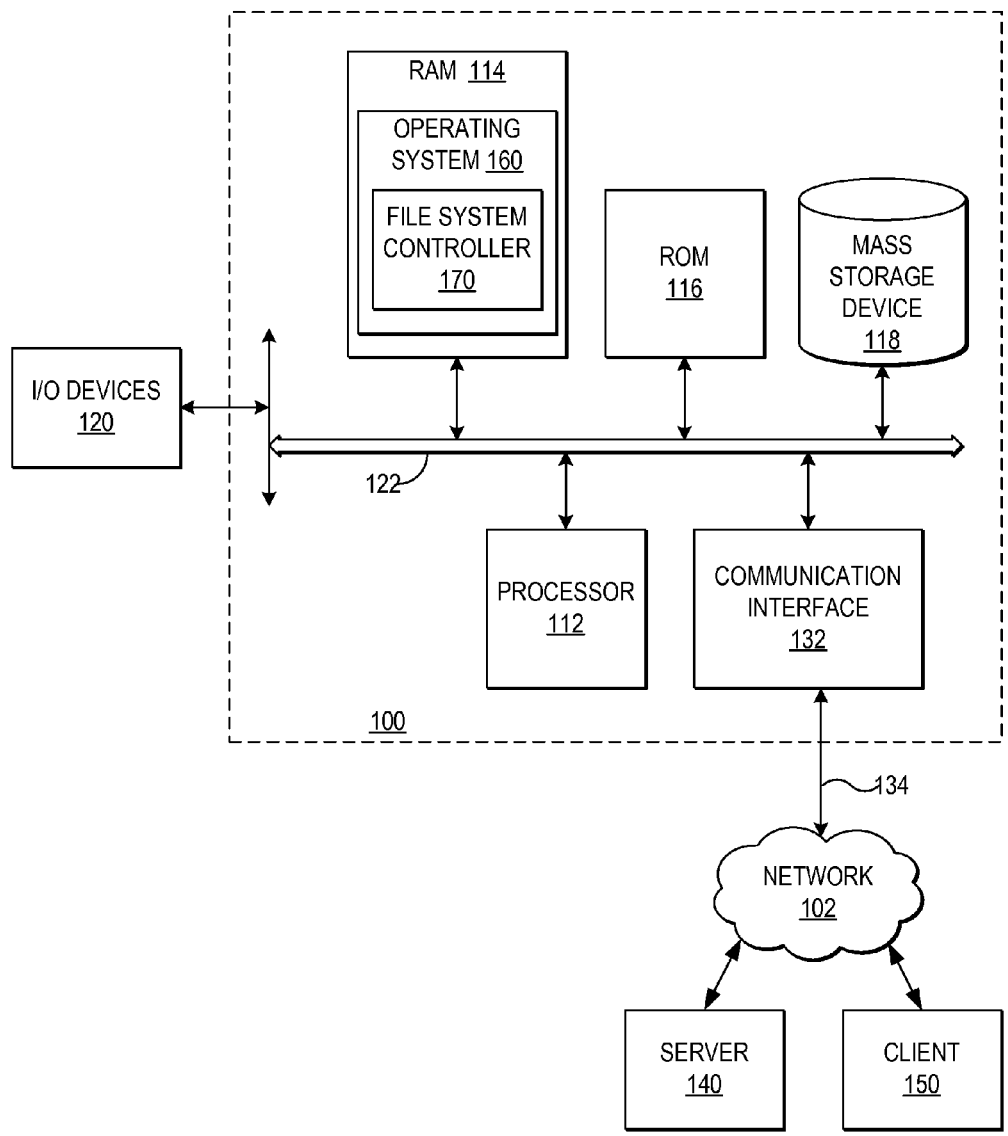
FIG. 1 is a block diagram depicting a computer system in which the present method, system, and program may be implemented.

Referring now to the drawings and in particular to FIG. 1, there is depicted one embodiment of a computing system through which the present method, system, and program may be implemented. The invention may be executed in a variety of systems, including a variety of computing systems and electronic devices.

Computer system 100 includes a bus 122 or other communication device for communicating information within computer system 100, and at least one processing device such as processor 112, coupled to bus 122 for processing program code and data. Bus 122 may include low-latency and higher latency paths that are connected by bridges and adapters and controlled within computer system 100 by multiple bus controllers. Processor 112 may be a general-purpose processor such as IBM's PowerPC (PowerPC is a registered trademark of International Business Machines Corporation) processor. When implemented as a server system, computer system 100 typically includes multiple processors designed to improve network servicing power.

Processor 112 is coupled, directly or indirectly, through bus 122 to memory elements. During normal operation, processor 112 processes data under the control of program code accessed from the memory elements. Memory elements can include local memory employed during actual execution of the program code, such as random access memory (RAM) 114, bulk storage, such as mass storage device 118, and cache memories (not depicted) which provide temporary storage of at least some program code to reduce the number of times code must be retrieved from bulk storage during execution. In one example, the program code accessible in RAM 114 is an operating system 160. Operating system 160 includes program code that facilitates, for example, a graphical user interface (GUI) via a display 124 and other output interfaces. In addition, operating system 160 includes a file system controller 170, which is the program code used to create and manage a file system.

The invention can take the form of an entirely hardware embodiment, an entirely software embodiment, or an embodiment containing both hardware and software elements. In a preferred embodiment, the invention is implemented in software, which includes but is not limited to firmware, resident software, microcode, etc. For example, in one embodiment, a file system controller 170, of operating system 160, contains program code that when executed on processor 112 creates and manages a file system and snapshots by carrying out the operations depicted in the flow diagrams and flowchart FIGS. 4, 5, 6, 7, and 8, for example, and other operations described herein. Alternatively, the steps of the present invention might be performed by specific hardware components that contain hardwired logic for performing the steps, or by any combination of programmed computer components and custom hardware components. Additionally, RAM 114 may include an application programming interface or other interface that provides extensions to enable application developers to develop software that extends the functionality of operating system 160 to include file system controller 170.

In addition, the invention can take the form of a computer program product accessible from a computer-usable or computer readable medium providing computer readable program code for use by or in connection with computer system 100 or any instruction execution system. For purposes of this description, a computer-usable or computer readable medium can be any apparatus that can contain or store the program for use by or in connection with the instruction execution system, apparatus, or device. In one example, a computer-usable or computer readable medium is any apparatus that participates in providing program code to processor 112 or other components of computer system 100 for execution.

Such a medium may take many forms including, but not limited to, electronic, magnetic, optical, electromagnetic, infrared, or semiconductor system (or apparatus or device). Examples of a computer readable medium include, but are not limited to, a semiconductor or solid state memory, magnetic tape, a flexible disk, a hard disk, a removable computer diskette, random access memory (RAM) 114, read-only memory (ROM) 116, punch cards or any other physical medium with patterns of holes, a rigid magnetic disk and an optical disk. Current examples of optical disks include a compact disc ROM (CD-ROM), a compact disc-read/write (CD-R/W) and a digital video disc (DVD). In another example, a computer readable medium may include mass storage device 118, which as depicted is an internal component of computer system 100, but may be provided as a device external to computer system 100.

A communication interface 132 including network adapters may also be coupled to the system to enable computer system 100 to become coupled to other computer systems, such as server 140 or client 150, remote printers, or storage devices through intervening private or public networks. Network adapters within communication interface 132 may include, but are not limited to, modems, cable modems, and Ethernet cards.

In particular, communication interface 132 enables coupling to other devices through a network link 134 to a network 102. For example, a local area network (LAN), wide area network (WAN), or an Internet Service Provider (ISP) may facilitate network link 134. Network link 134 may provide wired and/or wireless network communications to one or more networks, such as network 102. Network 102 may refer to the worldwide collection of networks and gateways that use a particular protocol, such as Transmission Control Protocol (TCP) and Internet Protocol (IP), to communicate with one another.

In general, network link 134 and network 102 both use electrical, electromagnetic, or optical signals that carry digital data streams. The signals through the various networks and the signals on network link 134 and through communication interface 132, which carry the digital data to and from computer system 100, are examples of forms of carrier waves transporting the information.

When implemented as a server system, computer system 100 typically includes multiple communication interfaces accessible via multiple peripheral component interconnect (PCI) bus bridges connected to an input/output controller. In this manner, computer system 100 allows connections to multiple network computers, such as client 150, via network 102.

In addition, computer system 100 typically includes input/output (I/O) devices 120 (e.g. multiple peripheral components) that facilitate communication and may hold data. These peripheral components are coupled to computer system 100 either directly or indirectly through connections to multiple input/output (I/O) controllers, adapters, and expansion slots coupled to one of the multiple levels of bus 122. Examples of I/O devices 120 include, but are not limited to audio I/O devices for controlling audio inputs and outputs, display devices for providing visual, tactile, or other graphical representation formats, a cursor control devices for controlling the location of a pointer within the display devices, and a keyboard as an interface for inputs to computer system 100. In addition, I/O devices may include thumb drives or other portable data storage devices connected to computer system 100 via the I/O controllers, adapters, or expansion slots.

Those of ordinary skill in the art will appreciate that the hardware depicted in FIG. 1 may vary. Furthermore, those of ordinary skill in the art will appreciate that the depicted example is not meant to imply architectural limitations with respect to the present invention.

Referring now to FIG. 2, a block diagram illustrates layers of a file system with a file system snapshot stored within the disk space allocated to the file system. As used herein, the term "snapshot" is used to refer to a snapshot of a file system and may also be called a "file system snapshot".

This example depicts user space 200, kernel space 202, and disk space 220. It will be understood that other spaces may be implemented and that components within each space may be distributed among other spaces or among multiple computer systems.

User space 200 includes file system user interface 204. File system user interface 204 receives commands, from a user, for accessing and controlling the file system. It will be understood that the user may be a person or an application.

Disk space 220 includes data logically viewed as file system 222. The allocation state of blocks within file system 222 is managed in bMap 226. In addition, although not depicted, file system 222 may include a file system directory or a file system directory may be maintained within kernel space 202.

In addition, file system 222 may include at least one snapshot, such as snapshot 224, and data for managing a snapshot, such as sMap 228. Snapshot 224 includes a read-only copy of at least a portion of the data that was located in file system 222 at a point in time. sMap 228 is a map tracking the modification state of blocks in the file system and tracking the addresses of allocated snapshot blocks. It will be understood that file system 222 may include multiple snapshots and associated mapping files.

Physically, file system 222 may be distributed in non-contiguous sections within disk space 220. Disk space 220 may include multiple types of physical data storage media, such as mass storage device 118, RAM 114, and data storage devices accessible as I/O devices 120.

Kernel space 202, which illustrates some of the functional components of operating system 160, includes file handling threads 206, file system snapshot threads 208, and logical volume manager (LVM) 212. In the example, file handling threads 206 and file system snapshot threads 208 represent components of file system controller 170.

File handling threads 206 perform file system management functions and data access, such as a read operation, write operation, or mount drive operation by accessing file system 222 to locate the file or files referencing the requested data. Snapshot threads 208 implement the processes for creating a snapshot, such as snapshot 224 and snapshot threads 208 are triggered when data in file system 222 is to be modified to determine whether to copy the data into snapshot 224.

In addition, kernel space 202 includes a logical volume manager 212. Logical volume manager 212 provides an interface between file handling threads 206 and snapshot threads 208, which view the logical representations of file system 222, and physical disk space 220. It will be understood that while the present invention is described with reference to logical volume manager 212 providing an interface between the operating system kernel and the physical storage devices, alternate embodiments of the invention may implement other types of data management systems for data storage and access.

In establishing snapshot 224, one of snapshot threads 208 is triggered to initialize the snapshot for a point in time. The snapshot thread blocks file handling threads 206 from writing to file system 222. In addition, the snapshot thread initializes an empty sMap 228 and then allows file handling threads 206 to resume operations. In initializing sMap 228, in one example, a data structure is allocated that is proportional to the size of file system 222 at the point in time. In another example, in initializing sMap 228 a multi-level mapping data structure may be implemented, where only a selection of levels are initialized during snapshot creation and other levels are initialized only as needed for maintaining the point in time image of file system 222.

In one example, sMap 228 maintains an entry for each block belonging to file system 222, where the blocks belonging to snapshot 224 are stored within the disk space of file system 222 but entries are not maintained in sMap 228 for these blocks. Each entry includes multiple bits which can be marked to indicate whether the block has been copied, deleted, or newly allocated. In addition, each entry includes an address of the location at which the snapshot data is stored.

According to an advantage, one of snapshot threads 208 is triggered when one of the blocks belonging to file system 222 is to be modified by one of file handling threads 206, through an allocation, write, or delete operation. The triggered snapshot thread blocks the file handling thread from performing the modification. Responsive to the type of data modification, the triggered snapshot thread determines whether to copy the block to be modified into a snapshot, such as snapshot 224, and whether to mark the entry for the block in sMap 228, before letting the file handling thread perform the modification.

In particular, once a snapshot thread blocks the file handling thread from modifying a block, the snapshot thread looks up sMap 228 for the block. If an entry in sMap 228 already exists, then the data stored at the entry is returned to the snapshot thread. If an entry in sMap 228 does not exist, then the thread calls for a page to be allocated contain the entry in sMap 228, updates the file page, initializes all the entries in the page to zero, and returns the data in the entry.

In the example, if a snapshot thread detects a block belonging to file system 222 being allocated, then the snapshot thread blocks the file handling thread and accesses the entry from sMap 228 for the block. If there is not an entry in sMap 228 for the block, then the snapshot thread updates sMap 228 to include an entry for the block and marks the entry as newly allocated. If there is an entry in sMap 228 for the block, then the snapshot thread marks the block as newly allocated. It is important to note that blocks being allocated to snapshot 224, and in particular pages allocated to sMap 228 to contain entries, are not marked as newly allocated, therefore there is not a recursive allocation of blocks.

In the example, if a snapshot thread detects a block being written to a block belonging to file system 222, the snapshot thread blocks the file handling thread and accesses the entry in sMap 228 for the block. If there is not an entry in sMap 228 for the block, then the snapshot thread copies the block into snapshot 224, updates the entry in sMap 228 for the block with the address of the location of the block, updates the entry in sMap 228 for the block with a marking of copied, and unblocks the file handling thread to write to the block in file system 222. Alternatively, if there is an entry in sMap 228 for the block marked as newly allocated, copied or deleted, then the snapshot thread ignores the block and lets the file system thread write to the block in file system 222.

In addition, in the example, if a snapshot thread detects a block belonging to the file system being deleted, the snapshot thread blocks the file handling thread and accesses the data from sMap 228 for the block. If there is not an entry in sMap 228 for the block, then the file system snapshot thread copies the block into snapshot 224, updates the entry in sMap 228 for the block with the address of the location of the block, and updates the entry in sMap 228 for the block with a marking of copied and deleted. If there is an entry in sMap 228 for the block and the entry is marked as newly allocated, then the snapshot thread clears the newly allocated marker in the entry and ignores the block as temporary. Otherwise, if there is an entry in sMap 228 for the block and entry is marked as already copied, then the snapshot thread marks the entry as copied and deleted and ignores the block as already copied.

With reference now to FIG. 3, a block diagram illustrates one example of a bMap and a sMap implemented within a file system and management of block allocations.

In the example, bMap 300 is an array of bits, where each position in the array index 302 maps to a block within file system 222. The actual bit setting within bMap 300 indicates the allocation state of each associated block with "0" for unallocated and "1" for allocated. In the embodiment, where the snapshot is stored within the file system disk space, bMap 300 includes the allocation state for allocated blocks belonging to the file system and for blocks allocated to the snapshot.

According to an advantage, in addition to managing an allocation state of a block within bMap 300 for purposes of managing file system allocations, newly allocated blocks, copied blocks, and deleted blocks are marked in sMap 310 such that the point in time image for a snapshot is maintained based on the in use state of a block monitored in sMap 310. In particular, in the example, sMap 310 is a data structure of an array of entries, where each entry in array index 312 maps to a block belonging to file system 222. Each entry includes multiple bits including, but not limited to, a copied bit as illustrated at reference numeral 314, a deleted bit as illustrated at reference numeral 316, and a newly allocated bit as illustrated at reference numeral 318. In addition, each entry may include a byte address pointing to a location of a snapshot of a block, as illustrated by the "X" at reference numeral 320.

In a first allocation example, the block indexed to "0" in bMap 300 and sMap 310 is being allocated by a file handling thread. A snapshot thread blocks the allocation and accesses the entry at the block number in sMap 310. sMap 310 has an empty entry for the block number indexed to "0". The snapshot thread detects that the sMap entry is empty and marks the block newly allocated, as illustrated at reference numeral 324. In addition, the snapshot thread then allows the file handling thread to allocate the block, updating the allocation state for the block number indexed to "0" as illustrated at reference numeral 322.

In a second allocation example, the block indexed to "1" in bMap 300 and sMap 310 is being allocated by a file handling thread. A snapshot thread blocks the allocation and accesses the entry at the block number in sMap 310. sMap 310 has an entry and the entry indicates the block is already copied and deleted. The snapshot thread marks the block newly allocated, as illustrated at reference numeral 328. In addition, the snapshot thread then allows the file handling thread to allocate the block, updating the allocation state for the block number indexed to "1" as illustrated at reference numeral 326.

In a first write example, the block indexed to "2" in bMap 300 and sMap 310 is being written to by a file handling thread. A snapshot thread blocks the write and accesses the entry at the block number in sMap 310. sMap 310 has an entry and the entry indicates the block is newly allocated. The snapshot thread detects the newly allocated state for the block indexed to "2" and ignores the block, as illustrated at reference numeral 330, since it was not in-use when the point in time snapshot was initialized.

In a second write example, the block indexed to "3" in bMap 300 and sMap 310 is being written to by a file handling thread. A snapshot thread blocks the write and accesses the entry at the block number in sMap 310. sMap 310 has an empty entry for the block number indexed to "3". The snapshot thread detects that the sMap entry is empty and copies the block, updates the location of the copy in the address for the entry at the block number indexed to "3", and marks the block copied, as illustrated at reference numeral 332.

In a first delete example, the block indexed to "4" in bMap 300 and sMap 310 is being deleted by a file handling thread. A snapshot thread blocks the delete and accesses the entry at the block number in sMap 310. sMap 310 has an entry and the entry indicates the block is marked as newly allocated. The snapshot thread detects the newly allocated state for the block indexed to "4" and clears the newly allocated marker for the entry and ignores the block since it is temporary, as illustrated at reference numeral 334. In addition, the snapshot thread then allows the file handling thread to delete the block and update the allocation state for the block number indexed to "4" as illustrated at reference numeral 336.

In a second delete example, the block indexed to "N" in bMap 300 and sMap 310 is being deleted by a file handling thread. A snapshot thread blocks the delete and accesses the entry at the block number in sMap 310. sMap 310 has an entry and the entry indicates the block is already copied. The snapshot thread detects the already copied state for the block indexed to "N" and marks the entry as deleted and ignores the block since the block was already copied, as illustrated at reference numeral 338. In addition, the snapshot thread then allows the file handling thread to delete the block and update the allocation state for the block number indexed to "N" as illustrated at reference numeral 340.

In a third delete example, the block indexed to "N+1" in bMap 300 and sMap 310 is being deleted by a file handling thread. A snapshot thread blocks the delete and accesses the entry at the block number in sMap 310. sMap 310 has an empty entry for the block. The snapshot thread detects the empty entry for the block number indexed to "N+1" and copies the block since it must be in-use, updates the location of the copy in the address for the entry at the block number indexed to "N+1" and marks the block copied and deleted, as illustrated at reference numeral 342.

It will be understood that in addition to the examples depicted, bMap 300 and sMap 310 may include additional or alternate combinations of marked bits and may be implemented using additional or alternate data storage structures. In addition, it will be understood that additional or alternate operations may be performed by file handling threads and snapshot threads in responding to block allocations, writes, and deletes.

Figure 4:
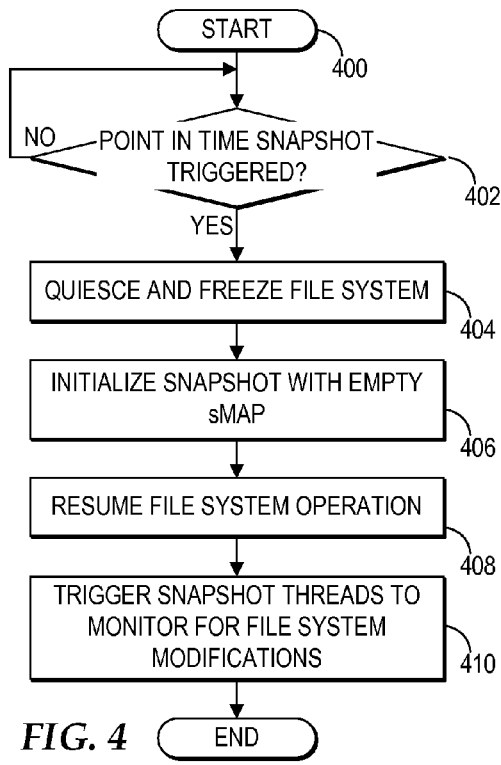
FIG. 4 is a high level logic flowchart illustrating a process and program for creating a point in time snapshot.

With reference now to FIG. 4, a high level logic flowchart depicts a process and program for creating a point in time snapshot. As illustrated, the process starts at block 400 and thereafter proceeds to block 402. Block 402 depicts a determination whether a point in time snapshot is triggered. If a point in time snapshot is triggered, then the process passes to block 404. Block 404 illustrates quiescing and freezing the file system. Next, block 406 depicts initializing the snapshot, including an empty sMap. Thereafter, block 408 illustrates restarting the file system. Next, block 410 illustrates triggering snapshot threads to monitor the file system for a file system modification, such as a block write, a block allocate or a block delete, until a next point in time snapshot is triggered.

Figure 5:
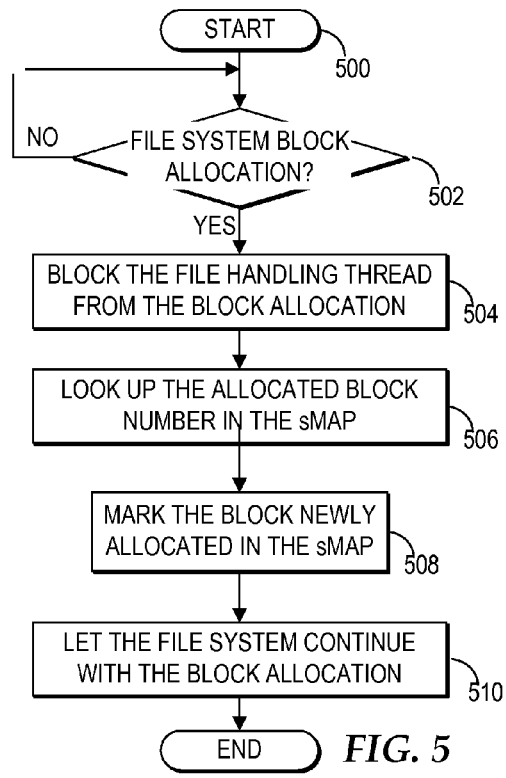
FIG. 5 is a high level logic flowchart depicting a process and program for a snapshot thread responding to a file system block allocation.

Referring now to FIG. 5, a high level logic flowchart illustrates a process and program for a snapshot thread responding to a file system block allocation. As depicted, the process starts at block 500 and thereafter proceeds to block 502. Block 502 illustrates a determination whether a file handling thread is going to allocate a block in the file system. If a file handling thread triggers a block allocation, then the process passes to block 504. Block 504 depicts blocking the file handling thread from allocating the block, and the process passes to block 506.

Block 506 illustrates looking up the allocated block number in the sMap. Next, block 508 illustrates marking the block newly allocated in the sMap. Thereafter, block 510 depicts letting the file system continue with the block allocation, and the process ends.

Figure 6:
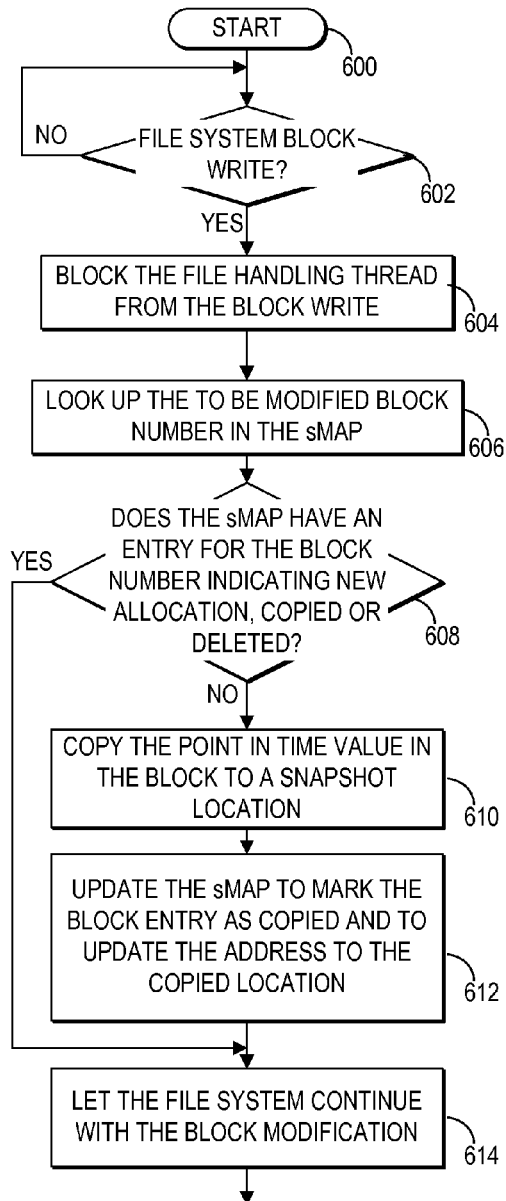
FIG. 6 is a high level logic flowchart illustrating a process and program for responding to a file system block write.

With reference now to FIG. 6, a high level logic flowchart depicts a process and program for responding to a file system block write. In the example, the process starts at block 600 and thereafter proceeds to block 602. Block 602 illustrates a determination whether a file handling thread is going to write to a block in the file system. If the file handling thread is going to write to a block in the file system, then the process passes to block 604. Block 604 depicts blocking the file handling thread from performing the block write, and the process passes to block 606.

Block 606 illustrates looking up the block number for the block to be written in the sMap. Next, block 608 depicts a determination whether the sMap for the block number already has an entry and the entry indicates any of a new allocation, copied or deleted. If the sMap for the block number has an entry indicating new allocation, copied, or deleted, then the process passes to block 614. Block 614 depicts letting the file system continue with the block modification, and the process ends.

Returning to block 608, if the sMap does not have an entry indicating a new allocation, copied or deleted, then the process passes to block 610. Block 610 illustrates copying the point in time value in the block to a new location. Next, block 612 depicts updating the sMap to mark the block entry as copied and to update the address to the copied to location in the sMap entry for the block entry, and the process passes to block 614.

Figure 7:
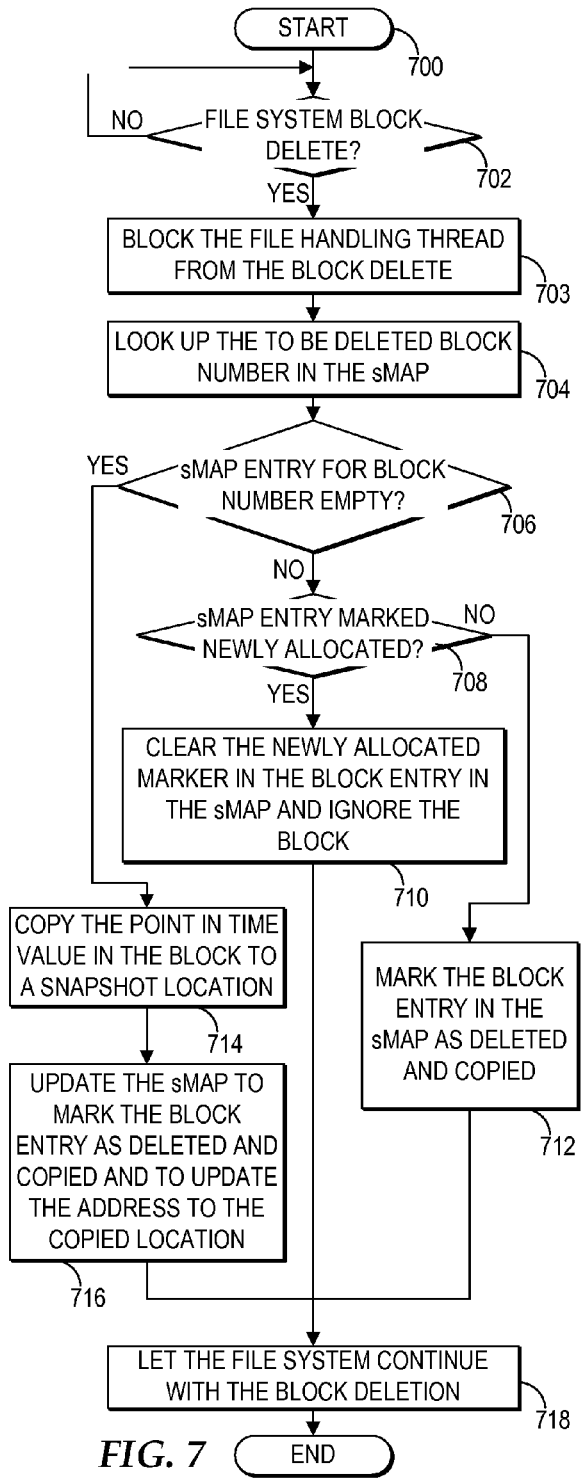
FIG. 7 is a high level logic flowchart depicting a process and program for responding to a file system block delete.

Referring now to FIG. 7, a high level logic flowchart illustrates a process and program for responding to a file system block delete. In the example, the process starts at block 700 and thereafter proceeds to block 702. Block 702 depicts a determination whether a file handling thread is going to delete a block in the file system. If the file handling thread is going to delete a block in the file system, then the process passes to block 703. Block 703 illustrates blocking the file handling thread from performing the block delete, and the process passes to block 704.

Block 704 depicts looking up to be deleted block number in the sMap. Next, block 706 illustrates a determination whether the sMap entry for the block number is empty. If the sMap entry for the block number is empty, then the process passes to block 714. Block 714 depicts copying the point in time value in the block to a snapshot location. Next, block 716 illustrates updating the sMap to mark the block entry as deleted and copied and to update the address in to the copied to location in the sMap entry for the block entry. Thereafter, block 718 depicts letting the file system continue with the block deletion, and the process ends.

Returning to block 706, if the sMap entry for the block number is not empty, then the process passes to block 708. Block 708 illustrates a determination whether the sMap entry for the block is marked as newly allocated. If the sMap entry for the block is marked as newly allocated, then the process passes to block 710. Block 710 depicts clearing the newly allocated marker in the block entry in the sMap and ignoring the block, and the process passes to block 718.

Returning to block 708, if the sMap entry for the block is not marked as newly allocated, then the process passes to block 712. Block 712 illustrates marking the sMap entry for the block as deleted and copied, and the process passes to block 718.

Figure 8:
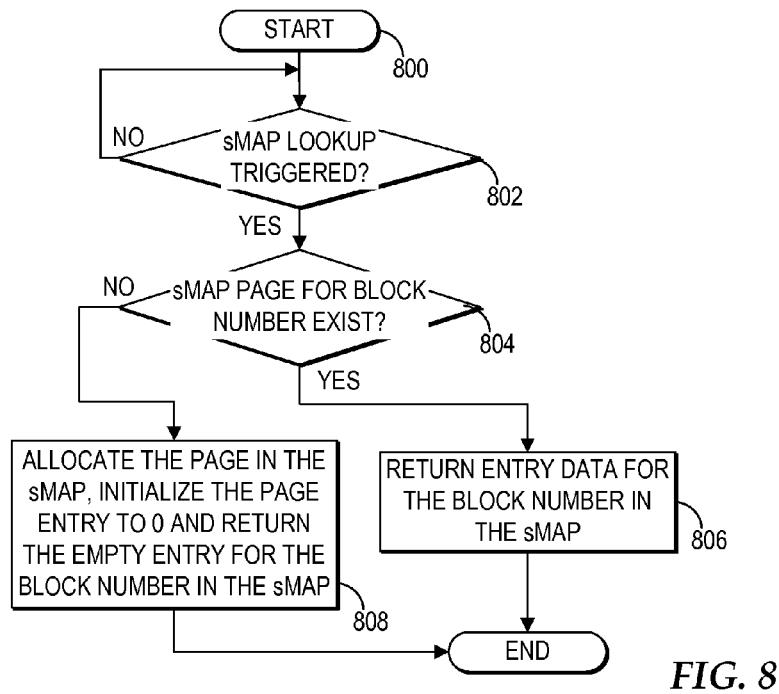
FIG. 8 is a high level logic flowchart illustrating a process and program for looking up a particular block based on block number in an sMap.

With reference now to FIG. 8, a high level logic flowchart illustrates a process and program for looking up a particular block based on block number in a sMap. As illustrated, the process starts at block 800 and thereafter passes to block 802. Block 802 depicts a determination whether a sMap lookup is triggered for a particular block number. If a sMap lookup is triggered for a particular block number, then the process passes to block 804. In one example, a snapshot thread may trigger a sMap lookup for a particular block number as illustrated at blocks 504, 606, and 704.

Block 804 depicts a determination whether a sMap entry for the block number exists. If an entry for the block number exists in the sMap, then the process passes to block 806.

Block 806 depicts returning the entry for the block number in the sMap to the calling thread, and the process ends. Otherwise, at block 804, if an entry for the block number does not exist in the sMap, then the process passes to block 808. Block 808 illustrates allocating a page to contain the entry in the sMap, initializing the entry to 0 and returning the entry for the block number in the sMap to the calling thread, and the process ends.

While the invention has been particularly shown and described with reference to a preferred embodiment, it will be understood by those skilled in the art that various changes in form and detail may be made therein without departing from the spirit and scope of the invention.

What is claimed is:

1. A method for managing a point in time snapshot of a file system stored within the space allocated to the file system, comprising:

managing a point in time snapshot within the space allocated to a file system;

tracking, for at least one block of the plurality of blocks of the file system not comprising the point in time snapshot, a separate entry in a snapshot map, within the space allocated to the file system, specifying a newly allocated bit marked if the at least one block is newly allocated following the creation of the point in time snapshot, a copied bit marked if the at least one block has been copied, a delete bit marked if the at least one block has been deleted, and specifying an addressed location of a snapshot copy of the at least one block if copied to the point in time snapshot, separately from tracking a mapping of an allocation state of each of said plurality of blocks of the file system;

responsive to detecting the file system triggered to write or delete a particular block from among the at least one block of the file system, allowing the file system to write to or delete the particular block without making a snapshot copy of the particular block into the point in time snapshot if a particular entry for the particular block in the snapshot map specifies the particular block is at least one of newly allocated, copied and deleted as marked in the newly allocated bit, copied bit, and deleted bit for the particular entry;

responsive to detecting the file system triggered to write to the particular block and at least one of the newly allocated bit, copied bit and deleted bit of the particular entry for the particular block in the snapshot map have not been marked at least one of newly allocated, copied and deleted, making a snapshot copy of the particular block into the point in time snapshot by copying the particular block to a new addressed location, updating the particular entry for the particular block with the new addressed location, and marking the copied bit for the particular entry as copied prior to allowing the file system to write the particular block;

responsive to detecting the file system triggered to delete the particular block and at least one of the newly allocated bit, copied bit and deleted bit of the particular entry for the particular block in the snapshot map have not been marked at least one of newly allocated, copied and deleted, copying the particular block to a new addressed location, updating the particular entry for the particular block with the new addressed location, and marking the copied bit and the deleted bit for the particular entry as copied and deleted prior to allowing the file system to delete the particular block;

responsive to detecting the file system triggered to delete the particular block and the newly allocated bit for the particular entry for the particular block in the snapshot map is marked newly allocated, clearing the newly allocated marking from the newly allocated bit for the particular entry prior to allowing the file system to delete the particular block;

responsive to detecting the file system triggered to delete the particular block and at least one of the copied bit and the delete bit for the particular entry for the particular block in the snapshot map is marked at least one of copied and deleted, marking the copied bit and deleted bit for the particular entry as copied and deleted prior to allowing the file system to delete the particular block; and responsive to detecting the file system triggered to allocate the particular block from among the at least one block of the file system and at least one of the newly allocated bit, the copied bit, and the delete bit of the particular entry for the particular block in the snapshot map are marked at least one of newly allocated, copied, and deleted, marking the newly allocated bit for the particular entry as newly allocated and allowing the file system to allocate the particular block without making a snapshot copy of the particular block to the point in time snapshot.

2. The method according to claim 1, further comprising:

indexing a separate block number for each of said plurality of blocks in a data structure for each of said mapping of said allocation state of each of said plurality of blocks and said snapshot map;

responsive to detecting the particular block being allocated, written to or deleted by the file system, looking up the particular block number for the particular block in the snapshot map;

responsive to an entry for the block number for the particular block existing in the snapshot map, returning whether the particular entry is marked each of newly allocated, copied, and deleted; and responsive to the snapshot map failing to already comprise the particular entry for the block number for the particular block, allocating the page space for the particular entry in the snapshot map, initializing the page space to empty, and returning the separate entry marked as empty.

3. The method according to claim 1 wherein at least one snapshot thread tracks said snapshot mapping and blocks the file system from allocating, writing to or deleting a block while determining whether to copy the block and wherein at least one file system handling thread for handling allocation, writing to and deleting blocks within the file system maintains said mapping of said allocation state of each of said plurality of blocks.

4. A computer system for managing a point in time snapshot of a file system, comprising:

a processor, a computer readable memory and a computer readable storage media;

first program instructions to manage the file system by at least one file handling thread comprising a plurality of blocks of an allocated portion of disk space of a computer system;

second program instructions to track, by the at least one file handling thread, a mapping of an allocation state of each of said plurality of blocks of the file system;

third program instructions to manage a point in time snapshot within the allocated portion of disk space to the file system by at least one snapshot thread;

fourth program instructions to track, by the snapshot thread, for at least one block of the plurality of blocks of the file system not comprising the point in time snapshot, a separate entry in a snapshot map, within the space allocated to the file system, specifying a newly allocated bit marked if the at least one block is newly allocated following the creation of the point in time snapshot, a copied bit marked if the at least one block has been copied, a delete bit marked if the at least one block has been deleted, and specifying an addressed location of a snapshot copy of the at least one block if copied within the point in time snapshot;

fifth program instructions for the snapshot thread, responsive to detecting the file handling thread triggered to write or delete a particular block from among the at least one block of the file system, to allow the file handling thread to write to or delete the particular block without making a snapshot copy of the particular block into the point in time snapshot if a particular entry for the particular block in the snapshot map specifies the particular block is at least one of newly allocated, copied and deleted as marked in the newly allocated bit, copied bit, and deleted bit for the particular entry;

sixth program instructions for the snapshot thread, responsive to detecting the file system triggered to write to the particular block and at least one of the newly allocated bit, copied bit and deleted bit of the particular entry for the particular block in the snapshot map have not been marked at least one of newly allocated, copied and deleted, to make a snapshot copy of the particular block into the point in time snapshot by copying the particular block to a new addressed location, updating the particular entry for the particular block with the new addressed location, and marking the copied bit for the particular entry as copied prior to allowing the file system to write the particular block;

seventh program instructions for the snapshot thread, responsive to detecting the file system triggered to delete the particular block and at least one of the newly allocated bit, copied bit and deleted bit of the particular entry for the particular block in the snapshot map have not been marked at least one of newly allocated, copied and deleted, to copy the particular block to a new addressed location, updating the particular entry for the particular block with the new addressed location, and marking the copied bit and the deleted bit for the particular entry as copied and deleted prior to allowing the file system to delete the particular block;

eighth program instructions for the snapshot thread, responsive to detecting the file system triggered to delete the particular block and the newly allocated bit for the particular entry for the particular block in the snapshot map is marked newly allocated, to clear the newly allocated marking from the newly allocated bit for the particular entry prior to allowing the file system to delete the particular block;

ninth program instructions for the snapshot thread, responsive to detecting the file system triggered to delete the particular block and at least one of the copied bit and the delete bit for the particular entry for the particular block in the snapshot map is marked at least one of copied and deleted, to mark the copied bit and deleted bit for the particular entry as copied and deleted prior to allowing the file system to delete the particular block; and tenth program instructions for the snapshot thread, responsive to detecting the file system triggered to allocate the particular block from among the at least one block of the file system and at least one of the newly allocated bit, the copied bit, and the delete bit of the particular entry for the particular block in the snapshot map are marked at least one of newly allocated, copied, and deleted, to mark the newly allocated bit for the particular entry as newly allocated and allowing the file system to allocate the particular block without making a snapshot copy of the particular block to the point in time snapshot;

wherein the first, second, third, fourth, fifth, sixth, seventh, eighth, ninth, and tenth program instructions are stored on the computer readable storage media for execution by the processor via the computer readable memory.

5. The system according to claim 4, further comprising:

the second program instructions to index a separate block number for each of said plurality of blocks in a data structure for each of said mapping of said allocation state of each of said plurality of blocks and said snapshot map;

the fifth program instructions for the snapshot thread, responsive to detecting the particular block being allocated, written to or deleted by the file system, to look up the particular block number for the particular block in the snapshot map;

the fifth program instructions, responsive to an entry for the block number for the particular block existing in the snapshot map, to return whether the particular entry is marked each of newly allocated, copied, and deleted; and the fifth program instructions, responsive to the snapshot map failing to already comprise the particular entry for the block number for the particular block, to allocate the page space for the particular entry in the snapshot map, initialize the page space to empty, and return the separate entry marked as empty.

6. A computer program product for managing a point in time snapshot of a file system stored within the space allocated to the file system, comprising:

a computer readable storage media;

first program instructions to manage a point in time snapshot within the space allocated to a file system;

second program instructions to track, for at least one block of the plurality of blocks of the file system not comprising the point in time snapshot, a separate entry in a snapshot map, within the space allocated to the file system, specifying a newly allocated bit marked if the at least one block is newly allocated following the creation of the point in time snapshot, a copied bit marked if the at least one block has been copied, a delete bit marked if the at least one block has been deleted, and specifying an addressed location of a snapshot copy of the at least one block if copied to the point in time snapshot, separately from tracking a mapping of an allocation state of each of said plurality of blocks of the file system;

third program instructions, responsive to detecting the file system triggered to write or delete a particular block from among the at least one block of the file system, allowing the file system to write to or delete the particular block without making a snapshot copy of the particular block into the point in time snapshot if a particular entry for the particular block in the snapshot map specifies the particular block is at least one of newly allocated, copied and deleted as marked in the newly allocated bit, copied bit, and deleted bit for the particular entry;

fourth program instructions, responsive to detecting the file system triggered to write to the particular block and at least one of the newly allocated bit, copied bit and deleted bit of the particular entry for the particular block in the snapshot map have not been marked at least one of newly allocated, copied and deleted, to make a snapshot copy of the particular block into the point in time snapshot by copying the particular block to a new addressed location, updating the particular entry for the particular block with the new addressed location, and marking the copied bit for the particular entry as copied prior to allowing the file system to write the particular block;

fifth program instructions, responsive to detecting the file system triggered to delete the particular block and at least one of the newly allocated bit, copied bit and deleted bit of the particular entry for the particular block in the snapshot map have not been marked at least one of newly allocated, copied and deleted, to copy the particular block to a new addressed location, updating the particular entry for the particular block with the new addressed location, and marking the copied bit and the deleted bit for the particular entry as copied and deleted prior to allowing the file system to delete the particular block;

sixth program instructions, responsive to detecting the file system triggered to delete the particular block and the newly allocated bit for the particular entry for the particular block in the snapshot map is marked newly allocated, to clear the newly allocated marking from the newly allocated bit for the particular entry prior to allowing the file system to delete the particular block;

seventh program instructions, responsive to detecting the file system triggered to delete the particular block and at least one of the copied bit and the delete bit for the particular entry for the particular block in the snapshot map is marked at least one of copied and deleted, to mark the copied bit and deleted bit for the particular entry as copied and deleted prior to allowing the file system to delete the particular block; and eighth program instructions, responsive to detecting the file system triggered to allocate the particular block from among the at least one block of the file system and at least one of the newly allocated bit, the copied bit, and the delete bit of the particular entry for the particular block in the snapshot map are marked at least one of newly allocated, copied, and deleted, to mark the newly allocated bit for the particular entry as newly allocated and allowing the file system to allocate the particular block without making a snapshot copy of the particular block to the point in time snapshot;

wherein the first, second, third, fourth, fifth, sixth, seventh, and eighth program instructions are stored on the computer readable storage media.

7. The computer program product according to claim 6, further comprising:

the second program instructions to index a separate block number for each of said plurality of blocks in a data structure for each of said mapping of said allocation state of each of said plurality of blocks and said snapshot map;

the second program instructions, responsive to detecting the particular block being allocated, written to or deleted by the file system, to look up the particular block number for the particular block in the snapshot map;

the second program instructions, responsive to an entry for the block number for the particular block existing in the snapshot map, to return whether the particular entry is marked each of newly allocated, copied, and deleted; and the second program instructions, responsive to the snapshot map failing to already comprise the particular entry for the block number for the particular block, to allocate the page space for the particular entry in the snapshot map, initialize the page space to empty, and return the separate entry marked as empty.

* * * * *